US010578728B2

(12) United States Patent
Hazama et al.

(10) Patent No.: US 10,578,728 B2
(45) Date of Patent: Mar. 3, 2020

(54) UNDERWATER DETECTION DEVICE (71) Applicant: Furuno Electric Co., Ltd., Nishinomiya (JP)

(72) Inventors: Takuto Hazama, Nishinomiya (JP); Takashi Matsumura, Nishinomiya (JP); Masato Okuda, Nishinomiya (JP); Yuriko Onishi, Nishinomiya (JP); Masaaki Matsubara, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 376 days.

(21) Appl. No.: 15/281,509

(22) Filed: Sep. 30, 2016

(65) Prior Publication Data
US 2017/0097408 A1    Apr. 6, 2017

(30) Foreign Application Priority Data

Oct. 2, 2015  (JP) .................................. 2015-196440

(51) Int. Cl.
*G01S 7/62* (2006.01)
*G01S 15/96* (2006.01)

(52) U.S. Cl.
CPC ............ *G01S 7/6272* (2013.01); *G01S 7/629* (2013.01); *G01S 7/6281* (2013.01); *G01S 15/96* (2013.01)

(58) Field of Classification Search
None
See application file for complete search history.

(56) References Cited

U.S. PATENT DOCUMENTS

2004/0233239 A1* 11/2004 Lahdesmaki ......... G06F 3/0482
                                                    715/810
2012/0274660 A1* 11/2012 Okuda ..................... G01S 7/04
                                                    345/629

FOREIGN PATENT DOCUMENTS

JP    H02124492 A    5/1990
JP    2001092576 A    4/2001

OTHER PUBLICATIONS

Marineelectronicshop, https://www.youtube.com/watch?v=qsKO4AJ5R8Y, Jul. 2012. (Year: 2012).*

* cited by examiner

*Primary Examiner* — Hovhannes Baghdasaryan
(74) *Attorney, Agent, or Firm* — Alleman Hall Creasman & Tuttle LLP (57) ABSTRACT

An underwater detection device is provided, which includes an echo signal processing module configured to acquire echo signals and detect signal levels of the echo signals corresponding to water depths, the echo signals being reflection waves caused by ultrasonic waves transmitted underwater, a detection image display controlling module configured to display on a display unit a detection image indicating the signal levels of the echo signals corresponding to the water depths and placed in a chronological order, and a menu display controlling module configured to display first superordinate menu buttons on the detection image displayed on the display unit, one of the first superordinate menu buttons displayed in one of end sections of the detection image where oldest information is displayed, the rest of the first superordinate menu buttons displayed to extend from the one of the first superordinate menu buttons in one of depth directions and time axis directions.

9 Claims, 10 Drawing Sheets

UNDERWATER DETECTION DEVICE

CROSS-REFERENCE TO RELATED APPLICATION(S)

This application claims priority under 35 U.S.C. § 119 to Japanese Patent Application No. 2015-196440, which was filed on Oct. 2, 2015, the entire disclosure of which is hereby incorporated by reference.

TECHNICAL FIELD

This disclosure relates to an underwater detection device, which detects a school of fish underwater, specifically relates to displaying menu buttons on an underwater detection device.

BACKGROUND

Conventionally, underwater detection devices which detect underwater by transmitting ultrasonic waves underwater and analyzing echo signals which are reflections caused by the ultrasonic waves are known. Such an underwater detection device generates and displays a detection image indicating signal levels of the echo signals corresponding to a water depth and placed in a chronological order (an order of acquisition of the echo signals).

JP2001-092576A discloses a depth sounding device provided with a plurality of switches at a right side of a display screen. A menu screen is displayed by controlling the switches. The menu screen is displayed in a large size at a center of a detection image. Further, JP1990-124492A discloses a fish finder which displays a menu screen below a detection image.

However, with JP2001-092576A, since the large menu screen is displayed at the center of the detection image, the detection image is uneasy to confirm while the menu screen is displayed. With JP1990-124492A, although the detection image is not blocked by the menu screen, since the menu screen dominates a part of the screen area, a situation arises that the detection image becomes small.

SUMMARY

The purpose of this disclosure relates to providing an underwater detection device, which has a configuration to secure a large display area for a detection image while avoiding interruption by a menu button, of the detection image.

According to one aspect of the present invention, an underwater detection device with the following configuration is provided. That is, the underwater detection device includes an echo signal processing module, a detection image display controlling module, and a menu display controlling module. The echo signal processing module acquires echo signals and detects signal levels of the echo signals corresponding to water depths, the echo signals being reflection waves caused by ultrasonic waves transmitted underwater. The detection image display controlling module displays on a display unit a detection image indicating the signal levels of the echo signals corresponding to the water depths and placed in a chronological order. The menu display controlling module displays first superordinate menu buttons on the detection image displayed on the display unit, one of the first superordinate menu buttons displayed in one of end sections of the detection image where oldest information is displayed, the rest of the first superordinate menu buttons displayed to extend from the one of the first superordinate menu buttons in one of depth directions and time axis directions.

Thus, since a user preferentially confirms latest information than the old information on the detection image in general, by displaying the first superordinate menu buttons to extend in/from the end section where the oldest information is displayed, a decrease of visual recognizability of the detection image can be minimized. Further by displaying the first superordinate menu buttons on the detection image, a screen size of the display unit can be effectively utilized and the detection image can be displayed in the large size.

With the underwater detection device described above, when one of the first superordinate menu buttons is selected and subordinate menus exist with respect to the selected first superordinate menu button, the menu display controlling module may display subordinate menu buttons corresponding to the subordinate menus, respectively.

Thus, the subordinate menu buttons are displayed only when necessary. Therefore, the decrease of the visual recognizability of the detection image can further be suppressed.

With the underwater detection device described above, the menu display controlling module may display the subordinate menu buttons to extend adjacent to the selected first superordinate menu button, in a direction perpendicular to the extending direction of the first superordinate menu buttons.

Thus, the subordinate menu buttons are displayed near the selected first superordinate menu button. Therefore, an operation for selecting a subordinate menu button can smoothly be performed. Further, by displaying the subordinate menu buttons to extend in the direction perpendicular to the extending direction of the first superordinate menu buttons, it can be prevented that the first superordinate menu buttons overlap with the subordinate menu buttons.

With the underwater detection device described above, at least while the subordinate menu buttons accept a selection operation, the menu display controlling module may display the first superordinate menu buttons to be translucent so that the detection image is seen through the first superordinate menu buttons.

Thus, the detection image is seen through the first superordinate menu buttons. Therefore, the decrease of the visual recognizability of the detection image can further be suppressed.

With the underwater detection device described above, when the menu display controlling module accepts a command to display a shortcut button, the menu display controlling module may remove the displayed menu buttons and display a menu button registered as the shortcut button. In a case where the shortcut button is selected and subordinate menus with respect to the shortcut button exist, the menu display controlling module may display subordinate menu buttons corresponding to the subordinate menus, respectively.

Thus, by registering a menu button which is used frequently as the shortcut button, the user can select the menu button without shifting for long time his/her focus from the detection image. Further, by removing the displayed menu buttons and displaying the shortcut button, the decrease of the visual recognizability of the detection image can be minimized. Additionally, since the subordinate menu buttons are displayed when the shortcut button is selected, the decrease of the visual recognizability of the detection image can further be suppressed.

With the underwater detection device described above, when displaying the shortcut button, the menu display controlling module may display, in addition to a corresponding menu button thereto, an image indicating that the shortcut button is a shortcut, the corresponding menu button being one of the menu buttons and the subordinate menu buttons.

Thus, by adding "the image indicating that the shortcut button is a shortcut," the user can instantly grasp whether the displayed button is the menu button or the shortcut button.

With the underwater detection device described above, the menu display controlling module may display a switch button adjacent to the first superordinate menu buttons in the extending direction of the first superordinate menu buttons. When the switch button is selected, the menu display controlling module may switch whether to display the menu buttons or the shortcut button.

Since only either one of the menu buttons and the shortcut is displayed on the display screen, a movement of a pointer and a shift of the line of sight of the user can be reduced when displaying the shortcut button.

With the underwater detection device described above, the menu display controlling module may move a pointer based on an operation performed on a user interface. When one of the first superordinate menu buttons and the subordinate menu buttons is dragged and dropped through the pointer, the menu display controlling module may register the one of the first superordinate menu buttons and the subordinate menu buttons as the shortcut button.

Thus, the shortcut button can be registered with an easy and intuitive operation.

With the underwater detection device described above, the menu display controlling module may display each of the menu buttons as a rectangular icon.

Thus, the menu buttons can be displayed in a small space.

With the underwater detection device described above, the menu display controlling module may display the first superordinate menu buttons to extend in the depth directions.

Thus, since the first superordinate menu buttons are displayed on the detection image to extend in/from the end section where the oldest information is displayed, the decrease of visual recognizability of the detection image can further be suppressed.

With the underwater detection device described above, the underwater detection device may further include a transducer and a display unit. The transducer transmits the ultrasonic waves underwater and receives the echo signals that are the reflection waves. The display unit displays the images generated by the detection image display controlling module and the menu display controlling module.

BRIEF DESCRIPTION OF THE DRAWING(S)

The present disclosure is illustrated by way of example and not by way of limitation in the figures of the accompanying drawings, in which like reference numerals indicate like elements and in which.

DETAILED DESCRIPTION

Figure 1:
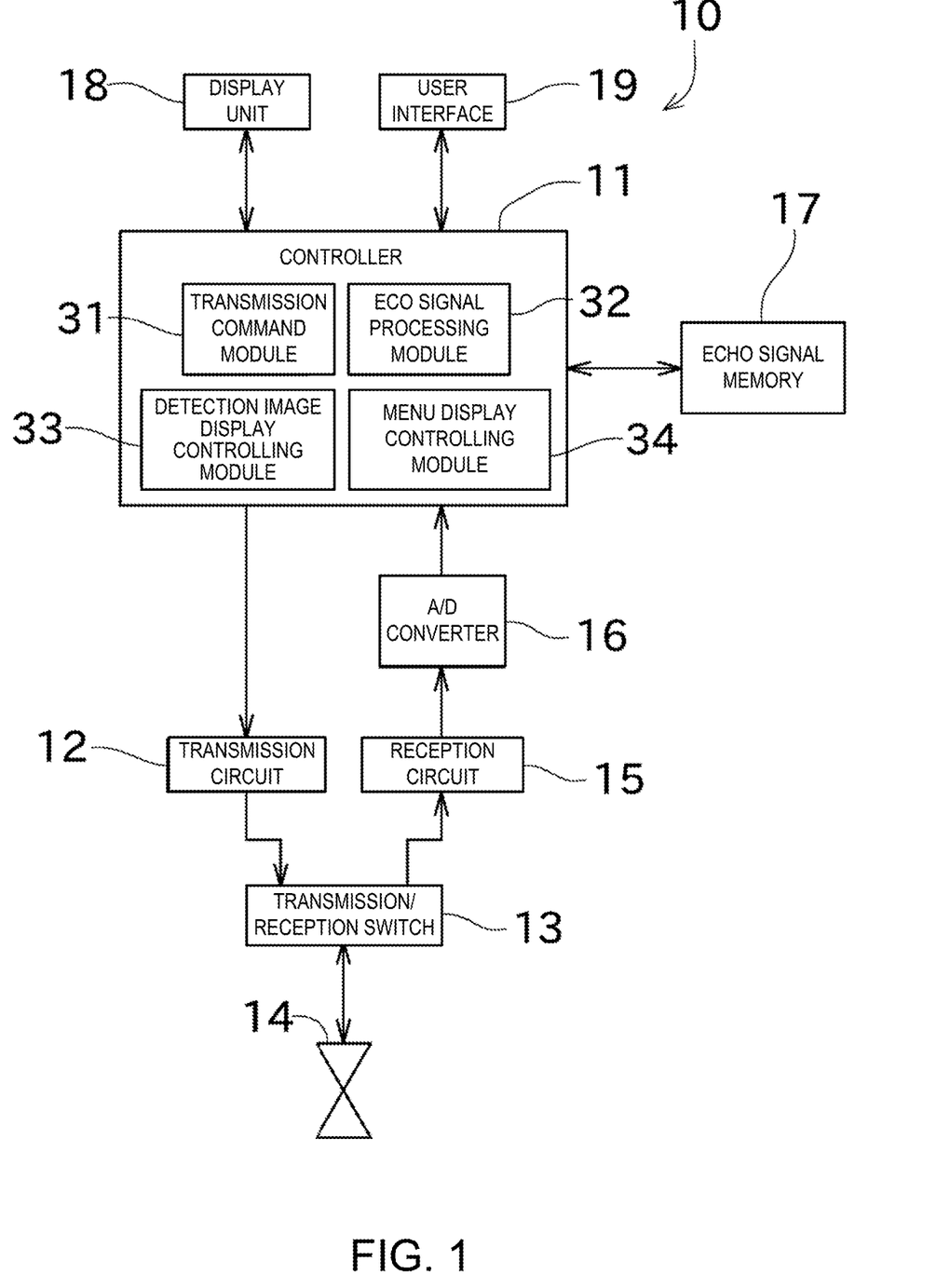
FIG. 1 is a block diagram illustrating a configuration of a fish finder according to one embodiment of this disclosure.

One embodiment of this disclosure is described with reference to the accompanying drawings. In the following embodiments, an example is illustrated in which this disclosure is applied to a ship. However, the present disclosure may be applied to any other watercrafts including boats, vessels, and submarines. FIG. 1 is a block diagram illustrating a configuration of a fish finder (underwater detection device) 10.

The fish finder 10 transmits ultrasonic waves underwater and receives echo signals which are reflection waves caused by the ultrasonic waves. The fish finder 10 generates based on the echo signals a detection image indicating water depths at which a school of fish, a water bottom, etc. exist and displays it. Hereinafter, a specific configuration of the fish finder 10 is described.

As illustrated in FIG. 1, the fish finder 10 includes a controller 11, a transmission circuit 12, a transmission/reception switch 13, a transducer 14, a reception circuit 15, an A/D converter 16, an echo signal memory 17, a display unit 18, and a user interface 19.

The controller 11 includes a transmission command module 31 configured to generate a signal indicating a timing to produce an ultrasonic wave, an amplitude of the ultrasonic wave, etc. and output it to the transmission circuit 12.

The transmission circuit 12 includes a trap circuit, generates a pulse signal based on the signal received from the transmission command module 31 and outputs it to the transducer 14 via the transmission/reception switch 13.

The transducer 14 of this embodiment is an oscillator which is attached to a bottom of a ship to which the fish finder 10 is mounted, and transmits the ultrasonic wave underwater (e.g., right below) based on the signal received from the transmission circuit 12. Further, the transducer 14 receives, as echo signal(s), reflection wave(s) caused by the ultrasonic wave reflected on fish and/or a water bottom. The transducer 14 outputs the received echo signal to the reception circuit 15 via the transmission/reception switch 13.

The transmission/reception switch 13 outputs the signal outputted by the transmission circuit 12 to the transducer 14, as well as outputting the echo signal acquired by the transducer 14.

The reception circuit 15, for example, amplifies the received echo signal and outputs it to the A/D converter 16. The A/D converter 16 converts the echo signal in an analog form into a digital signal and outputs it to the controller 11.

The controller 11 includes an echo signal processing module 32 configured to process the echo signal inputted by the A/D converter 16. Specifically, the echo signal processing module 32 grasps a water depth at which the ultrasonic wave reflected based on a period of time from the transmission of the ultrasonic wave until the reception of the echo signal thereof, and detects the signal level of the echo signal corresponding to the depth. Note that, the echo signal processing module 32 is achieved by executing a given program with an FPGA, a CPU, etc. which are not illustrated.

The echo signal memory 17 is a volatile/non-volatile memory capable of storing data. The echo signal memory 17 stores "the signal level of the echo signal corresponding to the depth" detected by the echo signal processing module 32 in association with the transmission/reception timing of the echo signal. Note that, the echo signal memory 17 may store the data before processed by the echo signal processing module 32.

Figure 2:
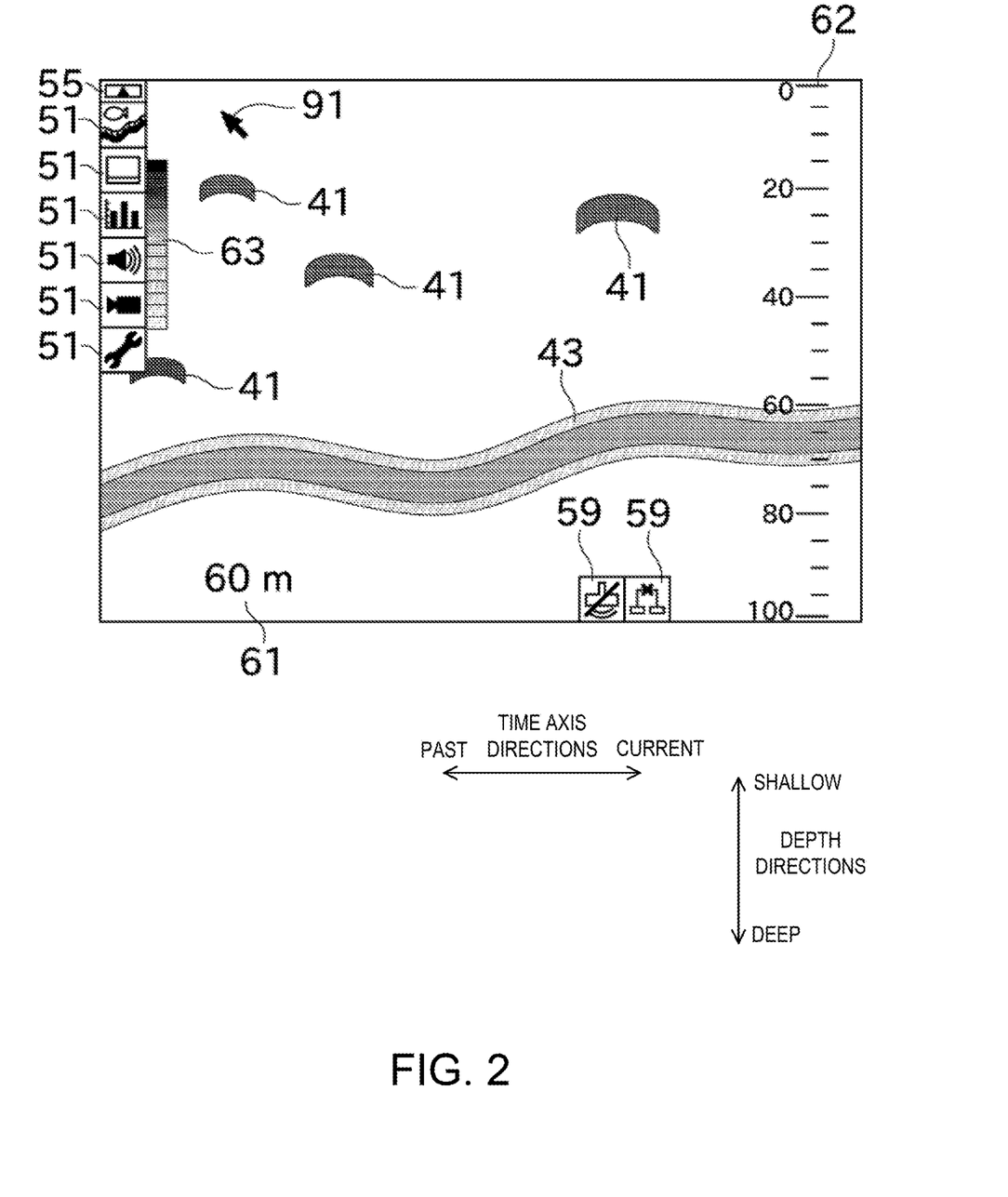
FIG. 2 is a view illustrating an example of a display screen displayed on a display unit.

The controller 11 includes a detection image display controlling module 33 configured to generate the detection image based on "the signal level of the echo signal corresponding to the depth" detected by the echo signal processing module 32. The detection image generated by the detection image display controlling module 33 is displayed on the display unit 18 configured by, for example, a liquid crystal display. The detection image indicates the signal levels of the echo signals corresponding to the depths and placed in a chronological order (an order of acquisition of the echo signals). As illustrated in FIG. 2, in the detection image, a vertical axis indicates depth directions and a horizontal axis indicates time axis directions. Each echo signal received by the fish finder 10 is displayed with a color tone or shade corresponding to the signal level. Further, the echo signals obtained in a transmission and reception regarding a single ultrasonic wave are illustrated at a given width (width in the time axis directions) on the detection image. Every time the ultrasonic wave is transmitted and the echo signal is received, the detection image display controlling module 33 shifts the detection image to one side (past side) in the time axis directions, and displays a new part of detection image in one end section (current-side section) of the displayed detection image in the time axis directions (end section where latest information is displayed).

Moreover, the controller 11 includes a menu display controlling module 34 configured to perform a control of displaying menu buttons through which various settings are performed, a control of displaying various information (current setting values, information detected based on the echo signal, information received from external device(s)), etc., and a control of moving a pointer, a cursor or the like (in this embodiment, pointer) which is displayed on the display screen. Images generated by the detection image display controlling module 33 and the menu display controlling module 34 are displayed on the display unit 18. Note that, the detection image display controlling module 33 and the menu display controlling module 34 are achieved by executing given programs with an FPGA, a CPU, etc. which are not illustrated.

The user interface 19 of this embodiment is a device which is a mouse or a trackball, and is capable of moving the pointer. Note that, the user interface 19 may be other pointing device (e.g., a keyboard with a touch pad). Moreover, the user interface 19 is not limited to a physical key and may be a touch panel.

Next, the display screen of the fish finder 10 is described with reference to FIGS. 2 to 5. Note that in this disclosure, "button" in "menu button" means "a kind of a graphical user interface configured to perform a selection on the display screen through the pointer." Further, the concept of "end section" includes an end and therearound (e.g., substantially equivalent to one icon).

As illustrated in FIG. 2, the display screen of the display unit 18 displays, as the detection image, school of fish echoes 41 and a water bottom echo 43. Each school of fish echo 41 indicates the echo signals of the reflection waves caused by the ultrasonic waves reflected on a school of fish. The water bottom echo 43 indicates the echo signals of the reflection waves caused by the ultrasonic waves reflected on the water bottom.

Further as illustrated in FIG. 2, the display screen of the display unit 18 displays, as display contents, a water depth display section 61, a water depth scale 62, and a signal level scale 63 by superimposing them on the detection image. The water depth display section 61 illustrates a current water bottom depth. The current water bottom depth is detected based on a latest echo signal etc. The water depth scale 62 is configured with a plurality of scale marks and indicates a depth indicated by the echo signal. The water depth scale 62, once a depth range of the detection image is changed, changes an interval and numeric value of the scale marks accordingly. The signal level scale 63 indicates a correspondence relationship between an intensity of the signal level and the color tone or shade of the echo.

Furthermore, as illustrated in FIG. 2, the display screen of the display unit 18 displays main menu buttons (first superordinate menu buttons) 51. Each main menu button 51 is configured by a rectangular frame and an icon. The main menu buttons 51 are buttons configured to change the setting of the fish finder 10 and command executions of various functions. The main menu buttons 51 are displayed on the detection image to extend in the depth directions from a position which is in a left end section (past-side end section in the time axis directions, where old information is displayed) and an upper end section (end section on the shallow side in the depth directions), in other words, extending downward from the upper end, along the past-side end section of the detection image. The menu display controlling module 34, upon detecting that a user moved the pointer 91 and left-clicked one of the main menu buttons 51, determines that this main menu button 51 is selected (meaning that the selection is made, same below).

Figure 3:
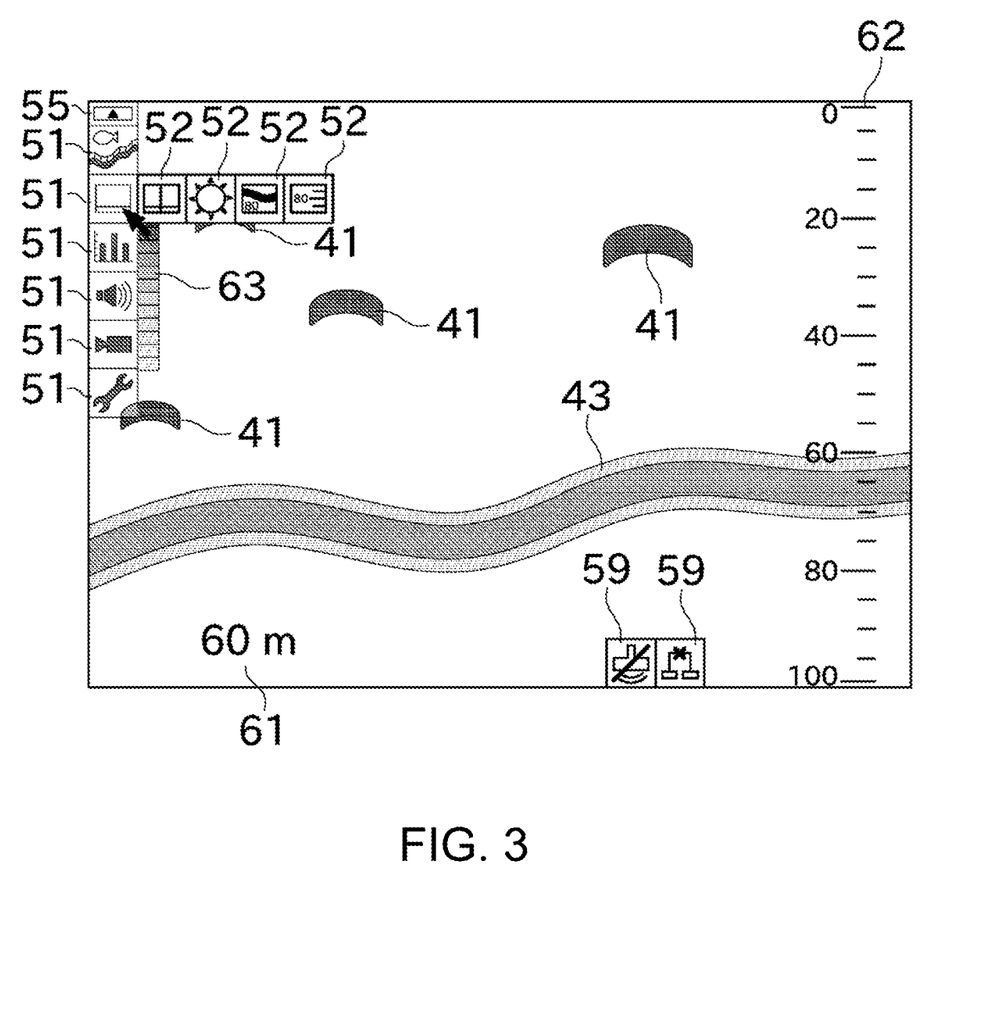
FIG. 3 is a view illustrating the display screen while a first subordinate menu button is displayed.

If the main menu button 51 is selected and subordinate menus with respect thereto do not exist, the menu display controlling module 34 executes processing associated with the selected main menu button 51. On the other hand, if the main menu button 51 is selected and the subordinate menus exist, first subordinate menu buttons 52 are additionally displayed as illustrated in FIG. 3. Since the first subordinate menu buttons 52 are not displayed before the main menu button 51 is selected, a prevention of a decrease of visual recognizability of the detection image is possible. Further in this embodiment, the main menu buttons 51 are displayed extending in the depth directions alone, and not in the time axis directions. Therefore, the prevention of the decrease of visual recognizability of the detection image is more possible. Note that, since the detection image keeps changing with time, the above configuration is significantly effective in preventing the decrease of visual recognizability of the detection image.

Each first subordinate menu button 52, similar to the main menu buttons 51, is configured by a rectangular frame and an icon. The first subordinate menu buttons 52 are located adjacent to the main menu button 51 which is superordinate with respect thereto, and extend in a direction perpendicular to the extending direction of the main menu buttons 51 (specifically, the time axis directions). The menu display controlling module 34, upon detecting that the user moved the pointer 91 and left-clicked one of the first subordinate menu buttons 52, determines that the first subordinate menu button 52 is selected.

Here, when displaying menu buttons in a hierarchy structure in this embodiment, superordinate menu buttons with respect to the menu buttons standing by for the selection (while the selection is accepted) are displayed to be translucent so that the detection image is visible. In the example illustrated in FIG. 3, since the first subordinate menu buttons 52 are on standby for the selection, the superordinate main menu buttons 51 with respect thereto are displayed to be translucent, the school of fish echoes 41 are visible through the main menu buttons 51. Note that, by clicking the detection image with the pointer 91, the standby for the selection is canceled and returns back the state of FIG. 2.

Figure 4:
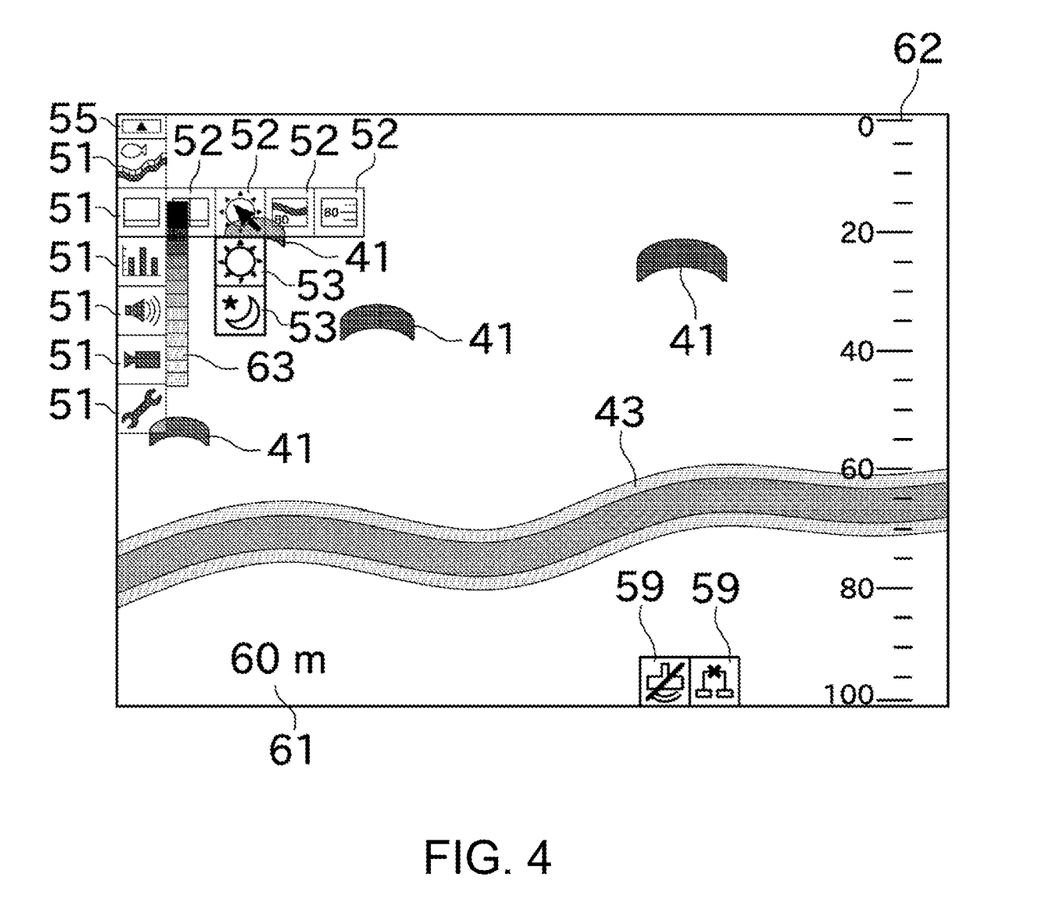
FIG. 4 is a view illustrating the display screen while a second subordinate menu button is displayed.

If one of the first subordinate menu buttons 52 is selected and subordinate menus with respect thereto do not exist, the menu display controlling module 34 executes processing associated with the selected first subordinate menu button 52. On the other hand, if the first subordinate menu button 52 is selected and the subordinate menus exist, the menu display controlling module 34 additionally displays second subordinate menu buttons 53 as illustrated in FIG. 4.

Each second subordinate menu buttons 53, similar to the main menu buttons 51 etc., is configured by a rectangular frame and an icon. The second subordinate menu buttons 53 are located adjacent to the first subordinate menu button 52 which is superordinate with respect thereto, and extend in a direction perpendicular to the extending direction of the first subordinate menu buttons 52 (specifically, to the deeper side in the depth directions). The menu display controlling module 34, upon detecting that the user moved the pointer 91 and left-clicked one of the second subordinate menu buttons 53, determines that the second subordinate menu button 53 is selected.

As described above, the superordinate menu buttons with respect to the menu buttons which are on standby for the selection are displayed to be translucent. Therefore, in the example of FIG. 4, the main menu buttons 51 and the first subordinate menu buttons 52 are displayed to be translucent.

Note that if subordinate menus (third subordinate menus) with respect to the selected second subordinate menu button 53 exist, the menu display controlling module 34 similarly displays third subordinate menu buttons extending in the time axis directions.

Figure 5:
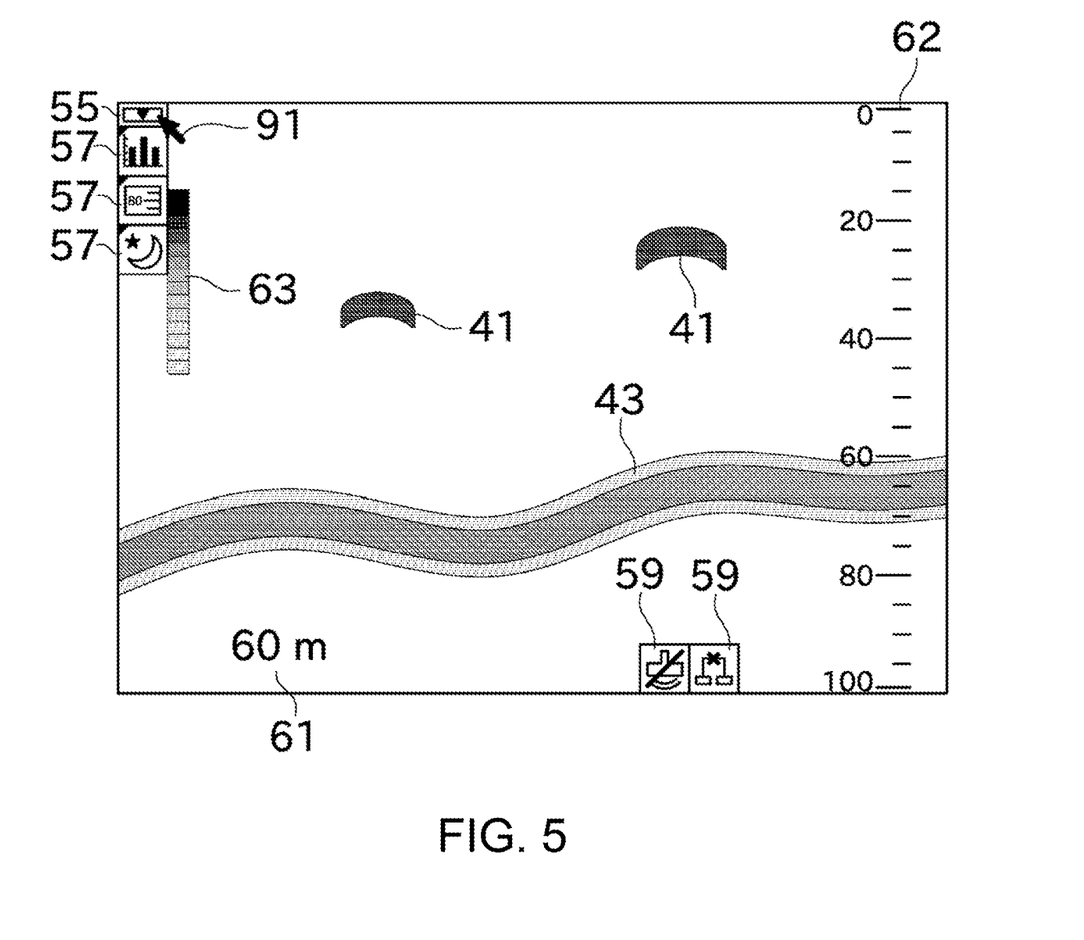
FIG. 5 is a view illustrating the display screen while a shortcut button is displayed.

Further, a switch button 55 (in the example of FIG. 2 etc., configured by a rectangular frame and a triangular icon) is displayed adjacent to the main menu buttons 51, on one side in the extending direction of the main menu buttons 51 (shallower side in the depth directions). The menu display controlling module 34, upon detecting that the user moved the pointer 91 and left-clicked the switch button 55, removes the main menu buttons 51 and displays a list of shortcut buttons 57 as illustrated in FIG. 5. Since the number of displayed buttons is reduced by removing the main menu buttons 51 as above, the decrease of visual recognizability of the detection image is suppressed. Further, since the switch button 55 is disposed near the main menu buttons 51, the movement of the user interface 19 and a shift of the line of sight of the user are reduced. The menu display controlling module 34, upon detecting that the user left-clicked the switch button 55 while the list of the shortcut buttons 57 is displayed, removes the shortcut buttons 57 and displays the main menu buttons 51. Note that, similar processing may be performed when a right-click operation is performed on the display screen (e.g., on the detection image or a menu button) alternatively/additionally to the left-click operation on the switch button 55.

Specific examples of the configuration of the menus are given next. The configurations of the main menu buttons 51 include a detection image setting, a display screen setting, chart display, a sound setting, and a video setting. Subordinate contents of the detection image setting include a gain adjustment and a noise removal. Subordinate contents of the display screen setting include splitting the display (FIG. 10, described later), a luminance adjustment, and a setting of the water depth display section 61. Further subordinate contents of the luminance adjustment include a day mode and a night mode. Subordinate contents of the chart display include displaying a distribution of body lengths of single fishes which exist within a given area, and a water temperature chart.

The shortcut buttons 57 are displayed extending at the same positions and direction as those of the main menu buttons 51. The shortcut buttons 57 are menu buttons extracted by the user from the main menu buttons 51, the first subordinate menu buttons 52 and the second subordinate menu buttons 53. Thus, by registering menu buttons which are used frequently (particularly subordinate menu buttons) as the shortcut buttons, the selection of a menu button can be performed swiftly without blocking the detection image. When displaying the shortcut buttons 57, the display mode of the switch button 55 is changed (specifically, the triangular icon is inverted). Further, when displaying the shortcut buttons 57, in addition to the corresponding icons of the main menu buttons 51 etc., images indicating that they are shortcuts (in the example of FIG. 5, triangular marks at upper-left corners of the buttons) are displayed. Thus, the user can instantly grasp whether the displayed button is the main menu button 51 or the shortcut button 57. Further, if one of the shortcut buttons 57 is selected and subordinate menus with respect thereto exist, the menu display controlling module 34 additionally displays the subordinate menu buttons.

Moreover, as illustrated in FIG. 2, the display screen of the display unit 18 displays alarm icons 59. The alarm icons 59, for example, blink to inform the user that the ultrasonic wave is not transmittable/receivable, a network is not connectable, the user interface 19 does not function, etc.

Next, a method of registering each shortcut button 57 is described with reference to FIGS. 6 to 8.

Figure 6:
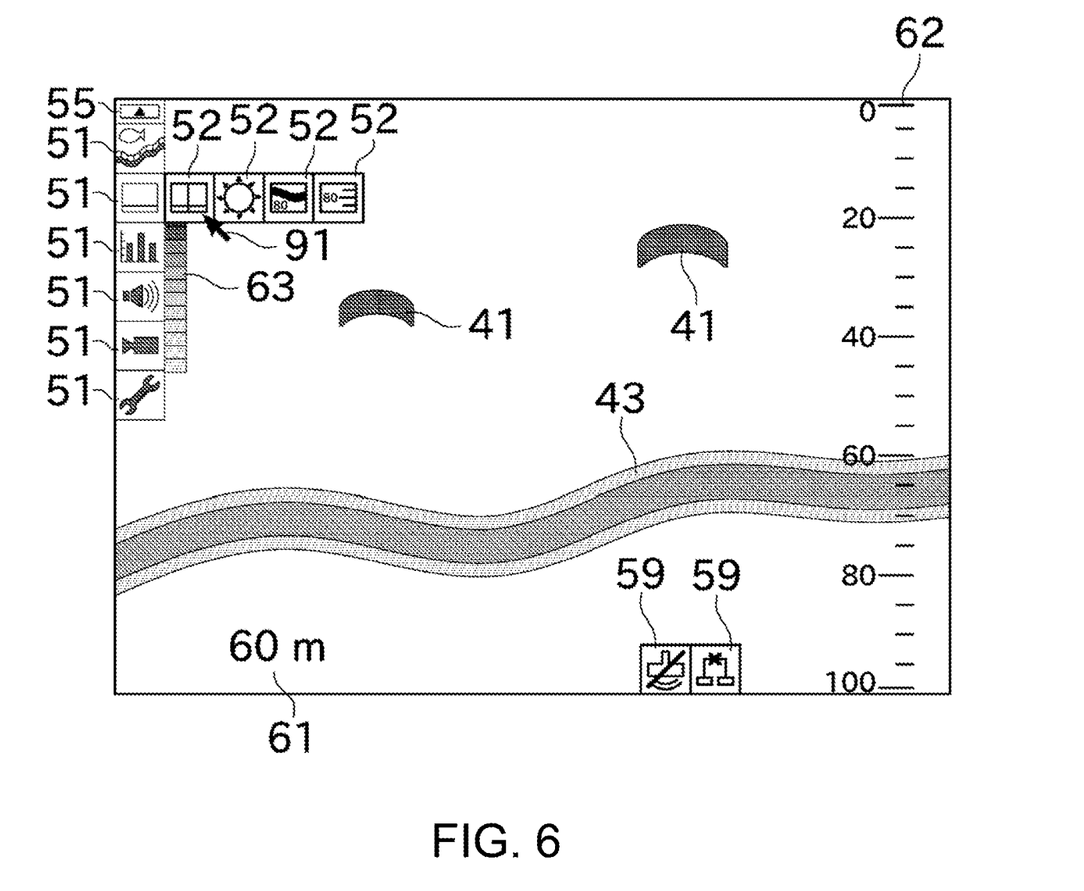
FIG. 6 is a view illustrating an operation of registering a shortcut (before dragged)
Figure 7:
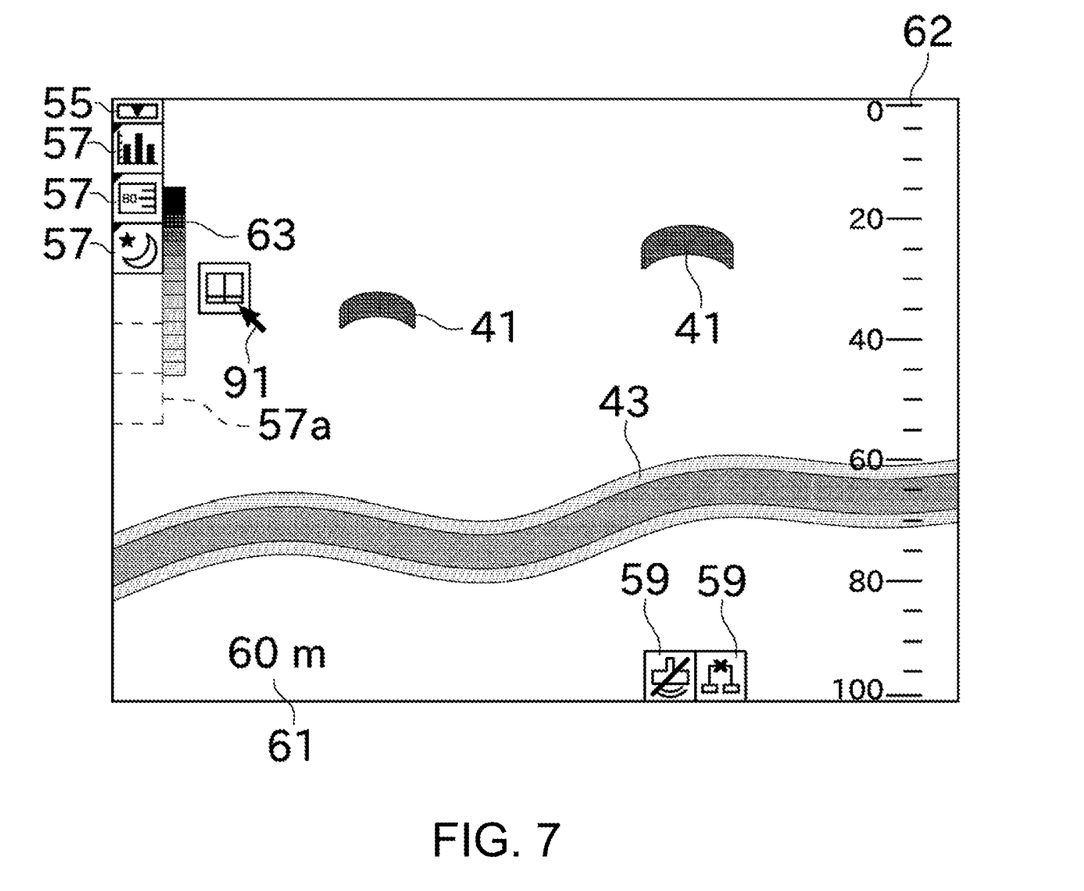
FIG. 7 is a view illustrating an operation of registering the shortcut (while dragged)

FIG. 6 is a view illustrating a situation where the main menu button 51 is selected and the first subordinate menu buttons 52 are displayed. From this state, by dragging (moving the pointer 91 while pressing a left button of the user interface 19) one of the first subordinate menu buttons 52, as illustrated in FIG. 7, a list of the shortcut buttons 57 and a shortcut vacant section 57a are displayed.

Figure 8:
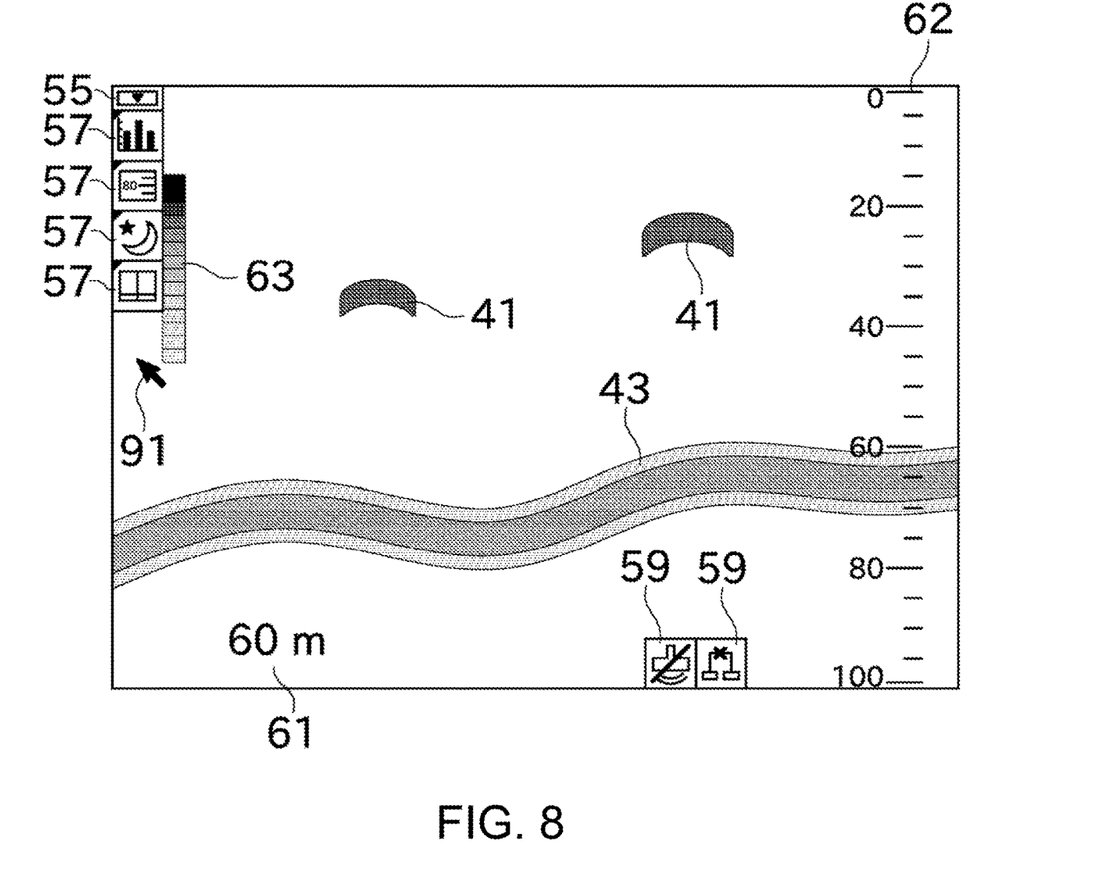
FIG. 8 is a view illustrating the display screen after the shortcut registration operation.

The user can register the first subordinate menu button 52 as a shortcut, by moving it to the shortcut vacant section 57a (also see FIG. 8). Note that, also for a case of registering the main menu button 51 and the second subordinate menu button 53 as shortcuts, they may be registered by a similar registration operation. The registering method for shortcuts is arbitrary and may vary depending on the button.

Figure 9:
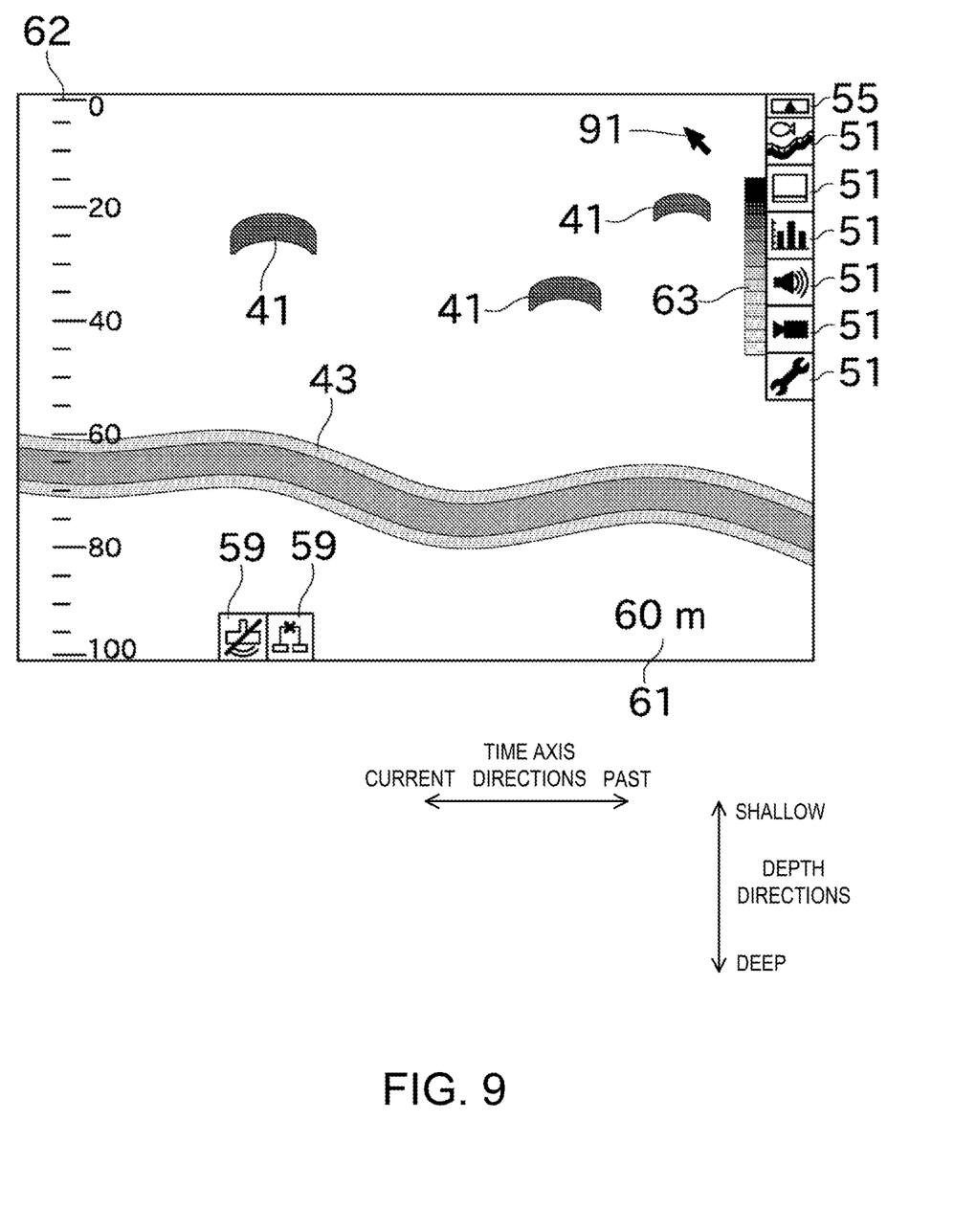
FIG. 9 is a view illustrating arrangement of menu buttons when a time flow in time axis directions is changed.

Next, a case where the time axis directions are reversed (i.e., a case where the past side is on the right of the display screen) is described with reference to FIG. 9.

In this case, the main menu buttons 51 are displayed in a right end section of the detection image (the past-side end section in the time axis directions) to extend in the depth directions. Since the user preferentially confirms latest information on the detection image in general, by displaying the menu buttons to extend in/from the most-previous end section, the decrease of visual recognizability of the detection image is minimized. Therefore in this embodiment, when the main menu button 51 is selected to change the time axis directions of the detection image, the display position of the main menu buttons 51 is changed. Note that, in the example of FIG. 9, due to the change of the display position of the main menu buttons 51, the water depth scale 62 is displayed in the left end section (the current-side end section in the time axis directions).

Next, a case of displaying two detection images on the display unit 18 is described with reference to FIG. 10.

Figure 10:
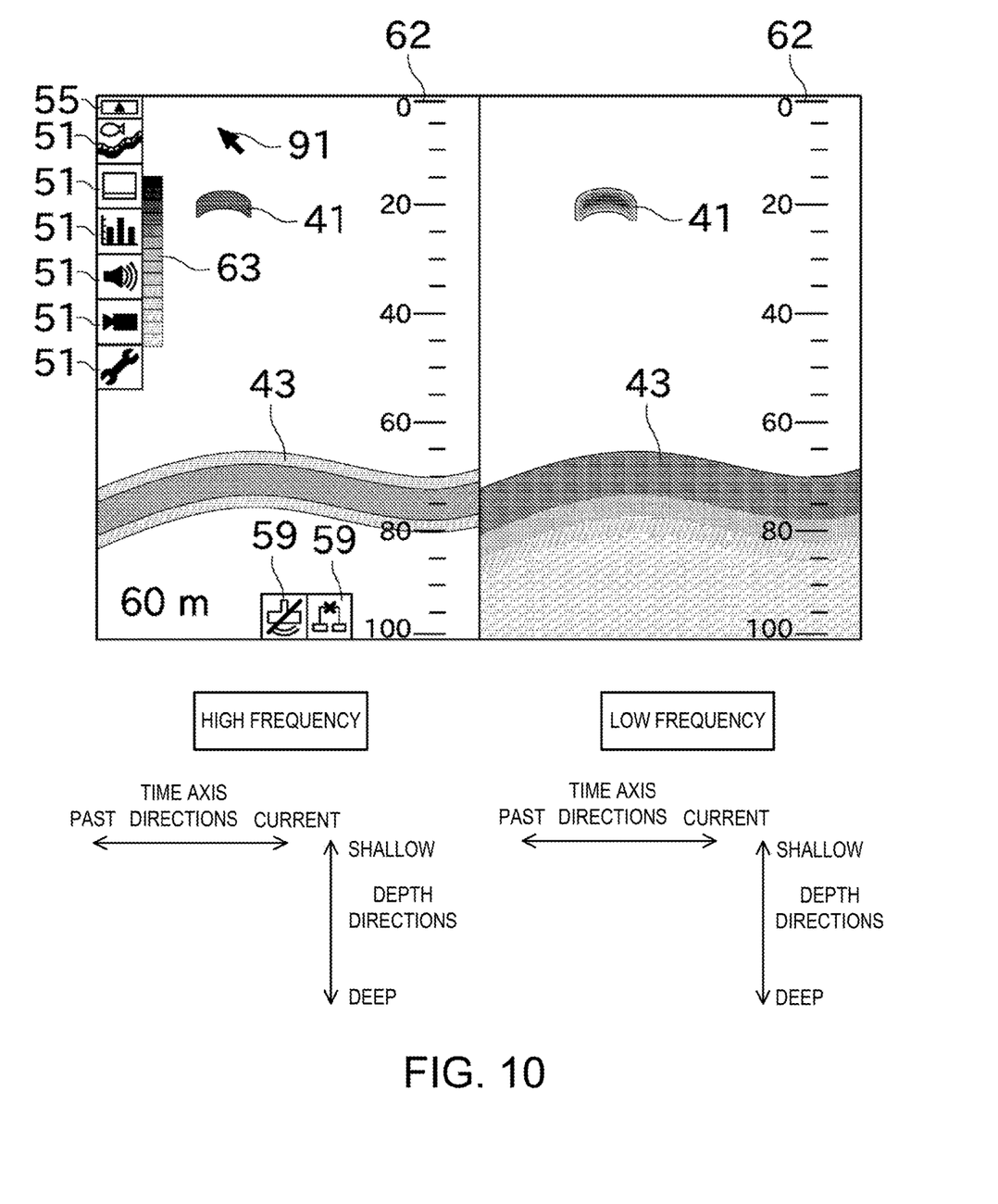
FIG. 10 is a view illustrating the display screen when two detection images are displayed thereon.

In FIG. 10, a detection image detected by using ultrasonic waves at high frequency and a detection image detected by using ultrasonic waves at low frequency are displayed aligning in the left-and-right directions (in the time axis directions). These two detection images have the same orientation in the time axis directions and the depth directions. However, these two detection images may have different orientations in the time axis directions and the depth directions. For example, the center of the display screen in the left-and-right directions may be set as the current side of the two detection images in the time axis directions, and the end sides of the display screen in the left-and-right directions may be set as the past side in the time axis directions.

In the case of displaying the two detection images, the main menu buttons 51 are displayed on the past side on one of the detection images. In this embodiment, the main menu buttons 51 are displayed on the left detection image; however, the main menu buttons 51 may be displayed on the right detection image. Further, the main menu buttons 51 may be displayed on both of the two detection images.

As described above, the fish finder 10 of this embodiment includes the echo signal processing module 32, the detection image display controlling module 33, and the menu display controlling module 34. The echo signal processing module 32 acquires the echo signals which are the reflection waves caused by the ultrasonic waves transmitted underwater, and detects the signal levels of the echo signals corresponding to the depth. The detection image display controlling module 33 displays on the display unit 18 the detection image indicating the signal levels of the echo signals corresponding to the depth and placed in the chronological order. The menu display controlling module 34 displays the main menu buttons 51 on the detection image displayed on the display unit, one of the main menu buttons 51 displayed in one of the end sections of the detection image where oldest information is displayed (past-side end section), the rest of the main menu buttons 51 displayed to extend from the one of the main menu buttons 51 in one of the depth directions and the time axis directions.

Since the user preferentially confirms the latest information than the old information on the detection image in general, by displaying the menu buttons to extend in/from the end section where the oldest information is displayed, the decrease of visual recognizability of the detection image is minimized. Further by displaying the menu buttons on the detection image, the screen size of the display unit is effectively utilized and the detection image is displayed in the large size.

Although the embodiment of this disclosure is described above, the above configuration may be modified as follows.

The setting manner of the time axis directions and the depth directions described in the above embodiment is merely one example and may suitably be changed. For example, the time axis directions may be the up-and-down directions, and the depth directions may be the left-and-right directions of the display screen. In this case, the main menu buttons 51 extend in/from one end section in the up-and-down directions. Further the number of the detection images displayed on the display screen may be three or more.

In the above embodiment, the main menu buttons 51 extend in the depth directions, in the past-side end section in the time axis directions. Alternatively, the main menu buttons 51 may extend in the time axis directions so that at least one of them is located in the past-side end section in the time axis directions, or may extend in both of the depth and time axis directions. The main menu buttons 51 are rectangles (substantially square, to be exact); however, they may be different shapes, such as circles. Further, the main menu buttons 51 are not limited to be icons, and may be display contents having a frame in which a name of a menu is described.

In the above embodiment, the switch button 55 is displayed above the main menu buttons 51 (shallow side in the depth directions); however, it may be displayed at a different location, such as below or right side of the main menu buttons 51. Further, the shortcut buttons 57 are displayed by removing the main menu buttons 51; however, the main menu buttons 51 and the shortcut buttons 57 may be displayed simultaneously.

In the above embodiment, since the user interface 19 is described as the mouse, the example in which the movement and left-click operation of the pointer 91 are used as the selecting method of the main menu buttons 51, etc. is described; however, in a case of using a different device, a selecting method corresponding to the device is used.

In the above embodiment, the end of the display screen and the end of the detection image coincide with each other in the left-and-right directions (time axis directions); however, they do not necessarily coincide. For example, in a case of displaying the detection image with a different image to align in the left-and-right directions, the end of the display screen does not coincide with the end of the detection image.

In the above embodiment, the display unit 18 only displays the detection image(s) obtained by the fish finder 10; however, other images generated by other navigational instrument(s) (radar apparatus, navigation system, etc.) may further be displayed. Further, although the user interface 19 mainly performs operations regarding the fish finder 10, it may further perform operations regarding the other navigational instrument(s).

In the above embodiment, the example in which this disclosure is applied to the fish finder 10 which mainly detects the school of fish is described; however, the detection target is not limited to the school of fish and may be a sank ship, a fishery resource, a shape of the water bottom, etc.

<Terminology>

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An underwater detection device, comprising:
an echo signal processing module configured to acquire echo signals and detect signal levels of the echo signals corresponding to water depths, the echo signals being reflection waves caused by ultrasonic waves transmitted underwater;

a detection image display controlling module configured to display on a display unit a detection image indicating the signal levels of the echo signals corresponding to the water depths and placed in a chronological order along time axis directions defining a first axis of the display unit; and a menu display controlling module configured to:
  display first superordinate menu buttons on the detection image displayed on the display unit, one of the first superordinate menu buttons displayed in one of end sections of the detection image where oldest information is displayed, the rest of the first superordinate menu buttons displayed to extend from the one of the first superordinate menu buttons in one of the time axis directions defining the first axis and depth directions defining a second axis of the display unit orthogonal to the first axis,
  display a switch button adjacent to the first superordinate menu buttons in the extending direction of the first superordinate menu buttons,
  in response to selection of the switch button, the menu display controlling module switches between displaying the first superordinate menu buttons and displaying a shortcut button,
  in response to receiving a command to display the shortcut button, the menu display controlling module removes the first superordinate menu buttons and displays a menu button selected from one or more subordinate menu buttons associated with the first superordinate menu buttons, the menu button being registered as the shortcut button, and
  in response to receiving a selection of the shortcut button, the menu display controlling module displays subordinate menu buttons corresponding to the shortcut button.

2. The underwater detection device of claim 1, wherein when one of the first superordinate menu buttons is selected, the menu display controlling module displays subordinate menu buttons corresponding to one or more subordinate menus, respectively.

3. The underwater detection device of claim 2, wherein the menu display controlling module displays the subordinate menu buttons to extend adjacent to the selected first superordinate menu button, in a direction perpendicular to the extending direction of the first superordinate menu buttons.

4. The underwater detection device of claim 2, wherein at least while the subordinate menu buttons accept a selection operation, the menu display controlling module displays the first superordinate menu buttons to be translucent so that the detection image is seen through the first superordinate menu buttons.

5. The underwater detection device of claim 1, wherein when displaying the shortcut button, the menu display controlling module displays, in addition to a corresponding menu button thereto, an image indicating that the shortcut button is a shortcut, the corresponding menu button being one of the first superordinate menu buttons and the subordinate menu buttons.

6. The underwater detection device of claim 1, wherein the menu display controlling module moves a pointer based on an operation performed on a user interface and, when one of the first superordinate menu buttons and the subordinate menu buttons is dragged and dropped through the pointer, registers the one of the first superordinate menu buttons and the subordinate menu buttons as the shortcut button.

7. The underwater detection device of claim 1, wherein the menu display controlling module displays each of the menu buttons as a rectangular icon.

8. The underwater detection device of claim 1, wherein the menu display controlling module displays the first superordinate menu buttons to extend in the depth directions.

9. The underwater detection device of claim 1, further comprising:
  a transducer configured to transmit the ultrasonic waves underwater and receive the echo signals that are the reflection waves; and
  a display unit configured to display the images generated by the detection image display controlling module and the menu display controlling module.

* * * * *